US006753836B2

(12) United States Patent
Kwon

(10) Patent No.: US 6,753,836 B2
(45) Date of Patent: Jun. 22, 2004

(54) LIQUID CRYSTAL DEVICE DRIVER CIRCUIT FOR ELECTROSTATIC DISCHARGE PROTECTION

(75) Inventor: Gue-hyung Kwon, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 465 days.

(21) Appl. No.: 09/878,608

(22) Filed: Jun. 11, 2001

(65) Prior Publication Data

US 2002/0105512 A1 Aug. 8, 2002

(30) Foreign Application Priority Data

Dec. 6, 2000 (KR) ........................................ 2000-73804

(51) Int. Cl.[7] ........................ G09G 3/36; G02F 1/1333; H02H 7/00; H02H 7/06; H01H 23/62

(52) U.S. Cl. ............................ 345/87; 345/98; 349/40; 361/18; 361/20; 361/21; 361/824; 257/355; 257/356

(58) Field of Search ..................... 345/87–104; 349/40; 361/18, 20–21, 681, 683, 686, 748, 805, 823–824

(56) References Cited

U.S. PATENT DOCUMENTS 5,361,185 A * 11/1994 Yu ............................. 361/111
5,596,342 A * 1/1997 Ikezaki et al. ................ 345/87
5,671,026 A * 9/1997 Shiraki et al. ................ 349/40
5,956,105 A * 9/1999 Yamazaki et al. ............ 349/43
5,973,658 A * 10/1999 Kim et al. ..................... 345/92
6,043,971 A * 3/2000 Song et al. ................. 361/111
6,072,550 A * 6/2000 Kim ............................ 349/40
6,100,949 A * 8/2000 Kim ............................ 349/40
6,266,034 B1 * 7/2001 Cathey et al. ............. 345/74.1
2002/0018154 A1 * 2/2002 Yoo et al. ..................... 349/40
2002/0030509 A1 * 3/2002 Sakata et al. ................. 326/83
2002/0055219 A1 * 5/2002 Randazzo ................... 438/231
2002/0057392 A1 * 5/2002 Ha ............................. 349/40

* cited by examiner

*Primary Examiner*—Dennis-Doon Chow
*Assistant Examiner*—Michael J. Moyer

(57) ABSTRACT

A liquid crystal device (LCD) driver circuit includes first through N-th input pads for respectively receiving first through N-th voltages (N>1). First through N-th electrostatic discharge (ESD) protection units are respectively connected to the first through N-th input pads, and form a discharge path when an electrostatic pulse is respectively applied through any of the first through N-th input pads. An output driver has first through N-th resistors. The first through N-th resistors respectively receive the first through N-th voltages input through the first through N-th input pads. The output driver generates a driving voltage for driving an LCD from each of the first through N-th voltages received through the first through N-th resistors, respectively. The first through N-th resistors reduce a current flowing into the output driver when the electrostatic pulse is applied. Some or all ESD protection units may include a thin gate-oxide (gox) transistor.

20 Claims, 5 Drawing Sheets

LIQUID CRYSTAL DEVICE DRIVER CIRCUIT FOR ELECTROSTATIC DISCHARGE PROTECTION

BACKGROUND OF THE INVENTION

1. Technical Field

The present invention relates generally to liquid crystal devices and, in particular, to a liquid crystal device driver circuit for electrostatic discharge protection.

2. Description of Related Art

In general, a liquid crystal device (hereinafter referred to as "LCD") driver circuit or an integrated circuit (hereinafter referred to as "IC") drives a high-level LCD voltage (VLCD) to display information on an LCD panel. Here, the LCD voltage (VLCD) can be externally applied and internally generated using an analog circuit such as an internal charge pump, an operational amplifier, or a band gap circuit. The VLCD is an important factor of the picture quality of an LCD screen.

However, internal circuits in an LCD driver circuit can be damaged by an electrostatic discharge (hereinafter referred to as "ESD") phenomenon occurring in a voltage input port or a voltage output port. Thus, most semiconductor devices as well as the LCD driver circuit include devices for ESD protection on an input port or output port to protect the semiconductor devices from damage by the ESD phenomenon.

FIG. 1 is a circuit diagram of a conventional LCD driver circuit for ESD protection. The circuit shown in FIG. 1 is an example of a conventional driver circuit applied in a monochrome LCD and includes an input pad 10, a resistor R1, an ESD protection unit 12, a voltage generating unit 14, and an LCD output driver 16.

In the circuit shown in FIG. 1, LCD voltages (VLCDs) V1 through V5 are externally applied through each input pad, and high-level voltage is divided by the voltage generating unit 14 to generate the VLCDs V1 through V5. Although not specifically shown, second through fifth voltages V2 through V5 can be applied to the LCD output driver 16 by the same method as that used for a first voltage V1. During a normal operation, the ESD protection unit 12 does not operate. However, when an ESD pulse is applied through the input pad 10, the serial resistor R1 and a first protection device D1 or a second protection device D2 are turned on to form a discharge path for discharging a high current of the ESD pulse. Here, the high current of the ESD pulse is lowered by the serial resistor R1 connected to the input pad 10, to protect the internal circuits.

However, the amount of change of the LCD voltages (VLCDs) in the LCD driver circuit for driving a color LCD other than the monochrome LCD is strictly stipulated in its design specification. For example, under specific test conditions, when a difference between a current flowing into the pad 10 to which the LCD voltages (VLCDS) are input and a current flowing into the internal voltage generating unit 14 is 10 uA, the amount of change of the VLCDs is less than 10 mV. Thus, in the color LCD driver circuit, other than the circuit of FIG. 1, a serial resistor which is a main factor of voltage drop cannot be connected between an input pad and a voltage generating unit. As a result, the high current of the ESD pulse is transferred to the output driver 16 and the voltage generating unit 14, thereby causing physical damage. That is, when the ESD pulse with positive polarity or negative polarity is applied, first discharge is performed by the first and second protection devices D1 and D2 of the ESD protection unit 12 adjacent to the pad 10, and a remaining current is applied to the LCD output driver 16.

FIG. 2 a circuit diagram of an output driver applied in a conventional color LCD driver circuit. Each voltage transferring device to which VLCDs V1 through V3 having relatively high-voltage levels are transferred, is implemented by CMOS transfer gates TG21 through TG23. The transferring devices for transferring VLCDs V4 and V5 having low voltage levels are implemented by NMOS transistors MN21 and MN22. Also, an ESD protection unit 25 is provided to protect internal circuits from an ESD pulse applied through an output pad 22. The output driver of the color LCD driver circuit is designed to satisfy on-resistance according to its design specification. In other words, on-resistance of each of the transfer gates TG21 through TG23 and the NMOS transistors MN21 and MN22 is decided in proportion to the VLCDs V1 through V5. Thus, desired on-resistance for driving the VLCDs V4 and V5 having low voltage levels is obtained only by the NMOS transistors MN21 and MN22 having a small width.

However, in the case of using the NMOS transistors, there is no forward discharge path when the ESD pulse with positive polarity is applied. Also, since the discharge area is very small, the discharge capability is very weak.

Additionally, in the conventional LCD driver circuit, since the discharge efficiency of the protection devices (for example, D1 and D2 of FIG. 1) connected to the input pads is very low, ESD protection can be deteriorated. That is, since the VLCD voltages are higher than an operating voltage of any other circuit in the LCD driver, the ESD protection unit 12 of FIG. 1 is formed of a high voltage junction. However, since the operating voltage is high in the high voltage junction, a high current is not driven. Thus, in a case where the high current due to the ESD pulse is applied, the ESD protection can be deteriorated.

SUMMARY OF THE INVENTION

To solve the above and other related problems of the prior art, there is provided a liquid crystal device (LCD) driver circuit for electrostatic discharge protection. The LCD driver circuit is capable of preventing an output driver from being damaged by an ESD pulse in a color LCD driver circuit, and improves the efficiency of protecting against electrostatic discharge.

According to an aspect of the invention, there is provided a liquid crystal device (LCD) driver circuit. The LCD driver circuit includes first through N-th input pads for respectively receiving first through N-th voltages. The first through N-th voltages have different voltage levels and are externally applied to the LCD driver circuit. N is an integer greater than one. First through N-th electrostatic discharge (ESD) protection units are respectively connected to the first through N-th input pads, and form a discharge path when an electrostatic pulse is respectively applied through any of the first through N-th input pads. An output driver has first through N-th resistors. The first through N-th resistors respectively receive the first through N-th voltages input through the first through N-th input pads. The output driver generates a driving voltage for driving an LCD from each of the first through N-th voltages received through the first through N-th resistors, respectively. The first through N-th resistors reduce a current flowing into the output driver when the electrostatic pulse is applied.

According to another aspect of the invention, there is provided a liquid crystal device (LCD) driver circuit. The LCD driver circuit includes first through N-th input pads for respectively receiving first through N-th voltages. The first through N-th voltages have different voltage levels and are externally applied to the LCD driver circuit. N is an integer greater than one. First through N-th electrostatic discharge (ESD) protection units are respectively connected to the first through N-th input pads, and form a discharge path when an electrostatic pulse is respectively applied through any of the first through N-th input pads. An output driver has first through N-th voltage transferring means. The first through N-th voltage transferring means respectively transfer the first through N-th voltages input through the first through N-th input pads, respectively. The output driver generates a driving voltage for driving an LCD from each of the first through N-th voltages transmitted through the first through N-th voltage transferring means, respectively. At least one voltage transferring means of the first through N-th voltage transferring means transfers low-level voltages of the first through N-th voltages and has a parallel structure of a PMOS transistor and an NMOS transistor.

According to yet another aspect of the invention, there is provided a liquid crystal device (LCD) driver circuit. The LCD driver circuit includes first through N-th input pads for respectively receiving first through N-th voltages. The first through N-th voltages have different voltage levels and are externally applied to the LCD driver circuit. N is an integer greater than one. First through N-th electrostatic discharge (ESD) protection units are respectively connected to the first through N-th input pads, and form a discharge path when an electrostatic pulse is respectively applied through any of the first through N-th input pads. The first through N-th ESD protection units include at least one thin gate-oxide (gox) transistor.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
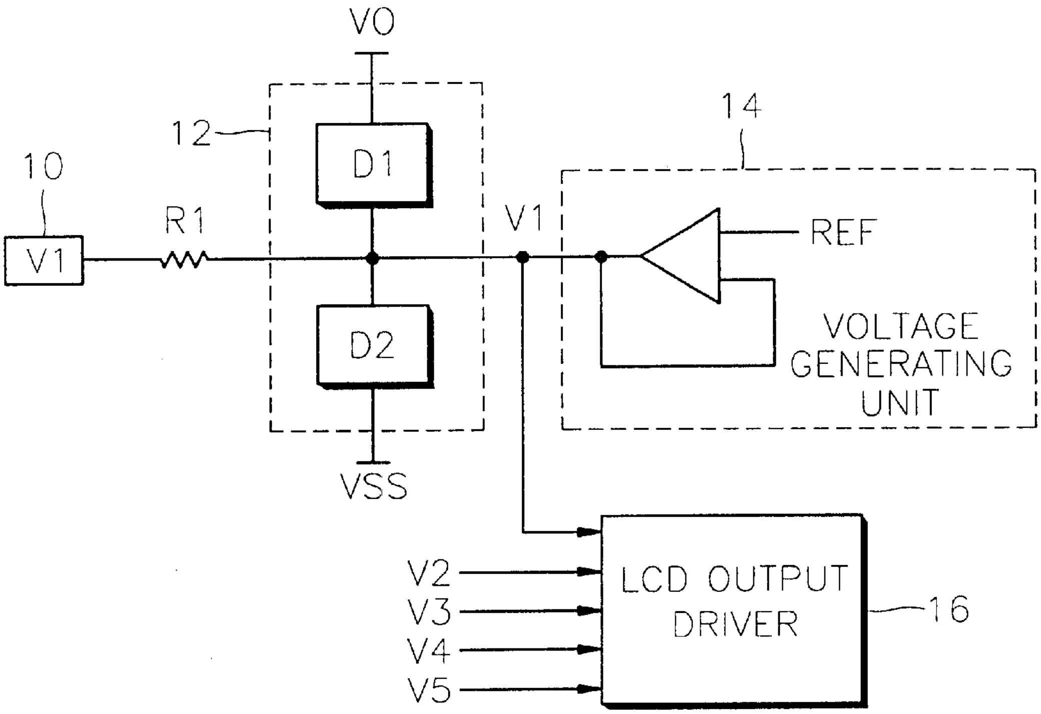
FIG. 1 (PRIOR ART)
FIG. 1 is a circuit diagram of a conventional LCD driver circuit for ESD protection.
Figure 2:
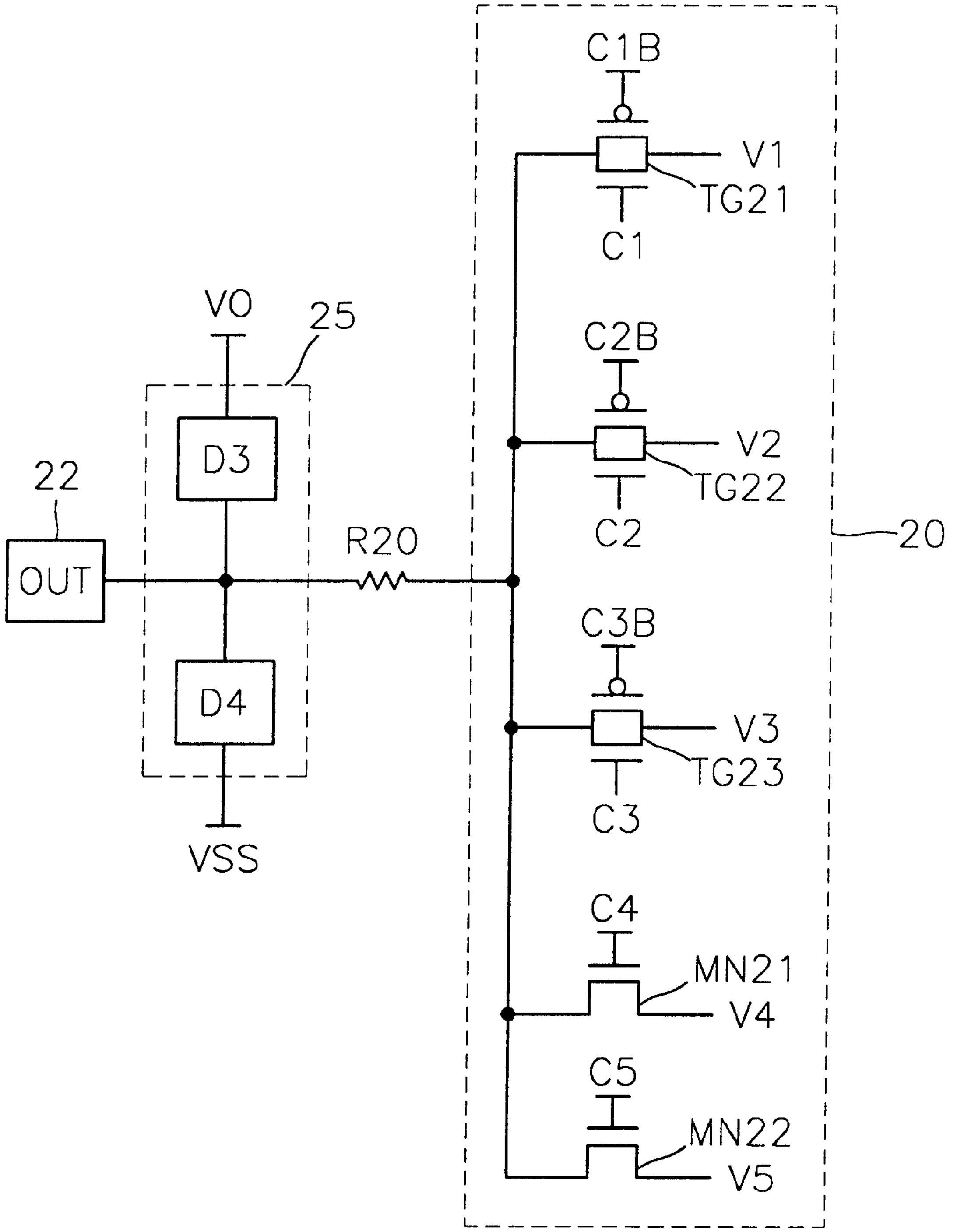
FIG. 2 (PRIOR ART)
FIG. 2 is a circuit diagram of an output driver applied in a conventional color LCD driver circuit.
Figure 3:
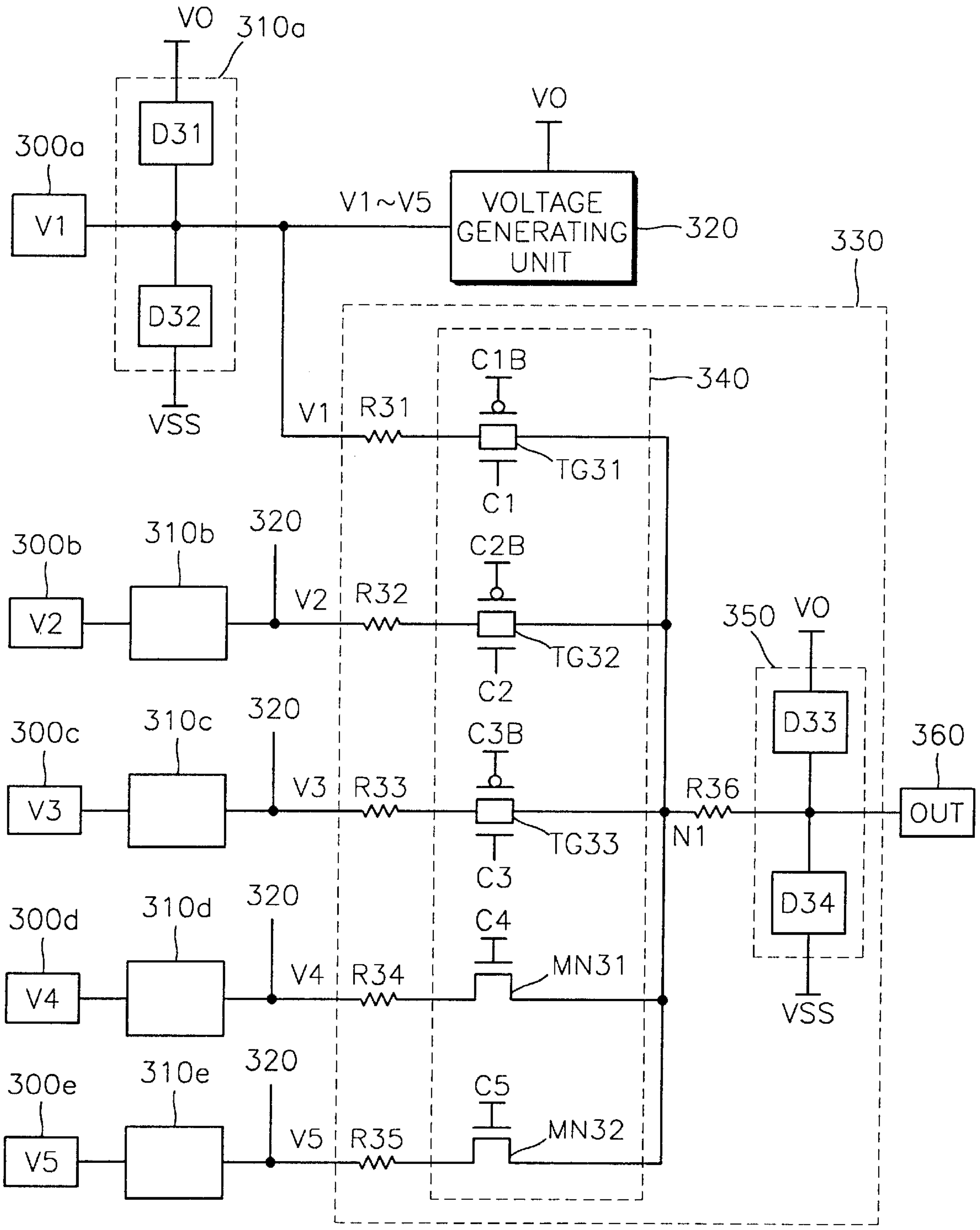
FIG. 3 is a circuit diagram of an LCD driver circuit for ESD protection according to an illustrative embodiment of the present invention.

Referring to FIG. 3, an LCD driver circuit includes input pads 300*a* through 300*e*, ESD protection units 310*a* through 310*e*, a voltage generating unit 320, and an LCD output driver 330. The LCD driver circuit of FIG. 3 can be applied to all kinds of LCD driver circuits, and particularly, to a color supper-twisted nematic (STN) LCD driver circuit of which a design specification is strict.

The input pads 300*a* through 300*e* respectively receive first through fifth LCD voltages V1 through V5 which are externally applied to the LCD driver circuit. Here, the first through fifth voltages V1 through V5 have different voltage levels. The first voltage V1 has the highest voltage level, and the second through fifth voltages V2 through V5 have voltage levels increasingly lower than the first voltage V1 (i.e., V1>V2>V3>V4>V5).

The ESD protection units 310*a* through 310*e* are respectively connected to each of the input pads 300*a* through 300*e*. For example, the ESD protection unit 310*a* connected to the first pad 300*a* includes protection devices D31 and D32 and forms a discharge path when an ESD pulse is applied. Here, the protection devices D31 and D32 are implemented by diodes or transistors. One side of the first protection device D31 is connected to a high voltage V0 having a level higher than the first voltage V1, and another side of the first protection device D31 is connected to one side of the first pad 300*a*. When the first protection device D31 is implemented by a diode, a cathode of the first protection device D31 is connected to the high voltage V0, and an anode of the first protection device D31 is connected to one side of the first pad 300*a*. Also, one side of the second protection device D32 is connected to one side of the first pad 300*a*, and another side of the second protection device D32 is connected to ground potential VSS. For example, when the second protection device D32 is implemented by a diode, an anode of the second protection device D32 is connected to the ground VSS, and a cathode of the second protection device D32 is connected to one side of the first pad 300*a*. The structure of other ESD protection units 310*b* through 310*e* is the same as that of the ESD protection unit 310*a* and, thus, a detailed description of ESD protection units 310*b* through 310*e* is omitted for the sake of brevity.

The voltage generating unit 320 properly divides the high voltage V0 and generates the first through fourth voltages V1 through V4 having different voltage levels. Although not specifically shown, the voltage generating unit 320 includes analog circuits such as an operational amplifier, a band gap reference voltage generating circuit, and a level shifter. When the first through fifth voltages V1 through V5 are externally applied through the input pads 300*a* through 300*e*, the voltage generating unit 320 does not operate.

The LCD output driver 330 generates the externally applied VLCD voltages V1 through V5, or the VLCD voltages V1 through V5 applied from the voltage generating unit 320 as a driving voltage in response to predetermined control signals. Here, the generated driving voltage is applied to an LCD panel (not shown).

Referring back to FIG. 3, the LCD output driver 330 includes resistors R31 through R35, a voltage transferring unit 340, and an output ESD protection unit 350. Specifically, the resistors R31 through R35 are respectively connected in series between each of the voltages V1 through V5 and the voltage transferring unit 340. The voltage transferring unit 340 includes CMOS transfer gates TG31 through TG33 and NMOS transistors MN31 and MN32. The voltage transferring unit 340 transfers the first through fifth voltages V1 through V5, which are applied through the resistors R31 through R35, respectively, to a first node N1 in response to predetermined control signals. That is, the transfer gate TG31 transfers the first voltage V1, which is applied through the resistor R31, to the first node N1 in response to control signals C1 and C1B. Here, C1 through C5 are signals applied from a control circuit (not shown) in the LCD driver circuit, and C1B through C5B are inversion signals of C1 through C5, respectively. The transfer gates TG32 and TG33 transfer the second and third voltages V2 and V3, which are applied through the resistors R32 and R33, respectively, to the first node N1 in response to the control signals C2/C2B and C3/C3B, respectively. That is, the transfer gates TG31 through TG33 respectively transfer the first through third voltages V1 through V3 having relatively high levels of the VLCD voltages. Also, sources of the NMOS transistors MN31 and MN32 are connected to one side of the resistors R34 and R35, respectively, and drains of the NMOS transistors MN31 and MN32 are connected to the first node N1. That is, the NMOS transistors MN31 and MN32 respectively transfer the fourth and fifth voltages V4 and V5, which are applied through the resistors R34 and R35, respectively, to the first node N1 in response to the control signals C4 and C5, respectively. Here, the fourth voltage V4 and the fifth voltage V5 are voltages lower than the voltages V1 through V3.

One side of a resistor R36 of the LCD output driver 330 is connected to the first node N1, and another side of the LCD output driver 330 is connected to an output pad 360. Here, the resistor R36 is used to reduce an ESD current applied from the output pad 360. The output ESD protection unit 350 forms a discharge path when an ESD pulse is applied through the output pad 360. The output ESD protection unit 350 includes protection devices D33 and D34 such as diodes or transistors. The output pad 360 outputs a driving voltage OUT output from the LCD output driver 330 to an LCD panel (not shown).

The operation of the LCD driver circuit will be described in further detail below. As described, the resistors R31 through R35 are connected between the first through fifth voltages V1 through V5 and transferring devices of the voltage transferring unit 340, respectively. Thus, in view of the input pads 300*a* through 300*e*, the resistors R31 through R35 are connected parallel to one another, and all resistance of the resistors R31 through R35 is reduced. During a normal operation, the ESD protection unit 310*a* does not operate.

Also, when the ESD pulse is externally applied through the input pads 300*a* through 300*e*, the discharge path is formed by the protection devices D31 and D32 of the ESD protection units 310*a* through 310*e*, and first discharge is performed. Here, an assumption is made that the protection devices D31 and D32 are diodes. For example, when the ESD pulse with positive polarity is applied, the first protection device D31 is turned on to form the discharge path. When the ESD pulse with negative polarity is applied, the second protection device D32 is turned on to form the discharge path. Here, part of a current is discharged, but remaining current is applied to the LCD output driver 330. However, since resistance is increased by the resistors R31 through R35, which are connected in series with the voltage transferring devices TG31 through TG33, and MN31 and MN32, respectively, the current applied to the voltage transferring devices TG31 through MN32 is lowered. Thus, when the ESD pulse is applied, the high current applied to the LCD output driver 330 is lowered, and internal circuits are protected although the discharge area is not large. Here, when the resistors R31 through R35 are implemented by diffusion-type resistors, parasitic diodes are formed. Thus, the discharge path due to the parasitic diodes can be formed.

As described above, ESD protection can be achieved by the resistors connected to input ports of the VLCD voltages V1 through V5 in the output driver 330 instead of the resistors connected in series with the input pads 300*a* through 300*e*.

Figure 4:
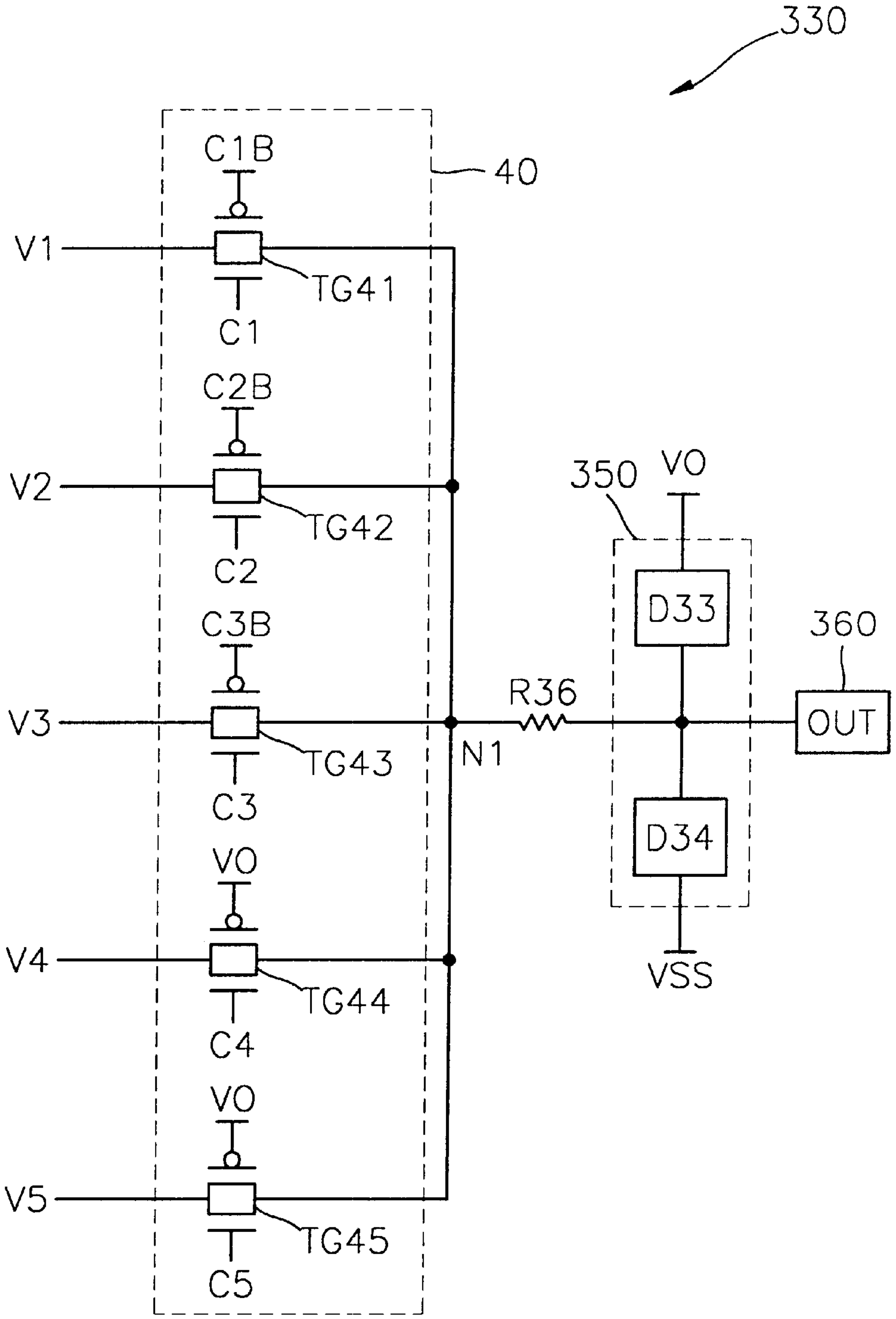
FIG. 4 is a circuit diagram of an output driver shown in FIG. 3, according to an illustrative embodiment of the present invention.

FIG. 4 is a circuit diagram of an output driver shown in FIG. 3, according to an illustrative embodiment of the present invention. The LCD output driver 330 includes a voltage transferring unit 40 and an output ESD protection unit 350. The output ESD protection unit 350, having the same configuration as that of the output ESD protection unit 350 of FIG. 3, performs the same function as that of the output ESD protection unit 350 of FIG. 3. Accordingly, a detailed description of the output ESD protection unit 350 of FIG. 4 is omitted for the sake of brevity.

Referring back to FIG. 4, the voltage transferring unit 40 includes transfer gates TG41 through TG45. The TG41 through TG45 are connected to first through fifth voltages V1 through V5, respectively, and respectively transfer the first through fifth voltages V1 through V5 to a first node N1 in response to control signals. That is, as shown in FIG. 3, a transferring device for transferring the fourth and fifth voltages V4 and V5 is implemented by CMOS transfer gates TG44 and TG45. In this case, each gate of PMOS transistors of the CMOS transfer gates TG44 and TG45 may be connected to inversion control signals C4B and C5B or to a high voltage V0. Also, the transferring device for transferring the fourth and fifth voltages V4 and V5 is implemented by connecting a PMOS transistor and an NMOS transistor in parallel. In this case, preferably, the gate of the PMOS transistor is connected to the high voltage V0.

The LCD output driver 330 will be described in further detail. That is, in the LCD output driver 330 of FIG. 4, the transferring device for inputting the voltages V4 and V5 having lower levels is implemented not only by the NMOS transistor but also by connecting the NMOS transistor parallel to the PMOS transistor. During a normal operation, the CMOS transfer gates TG44 and TG45, or the gates of the PMOS transistors having parallel connected-transistors are connected to the high voltage V0 and are turned off. Thus, during a normal operation, the PMOS transistor is turned off, and total turn-on resistance of the normal operation can be maintained.

However, when an ESD pulse is applied through the input pads 300*a* through 300*e* (see FIG. 3), a forward discharge path with respect to an ESD current with positive polarity is formed by the transfer gates TG44 and TG45, or the PMOS transistors. That is, according to the prior art, the transferring device for transferring the voltages V4 and V5 is implemented only by the NMOS transistor, and there was no forward discharge path with respect to the ESD pulse with positive polarity. But, in the present invention, the forward discharge path is formed and, thus, ESD protection is improved.

Figure 5:
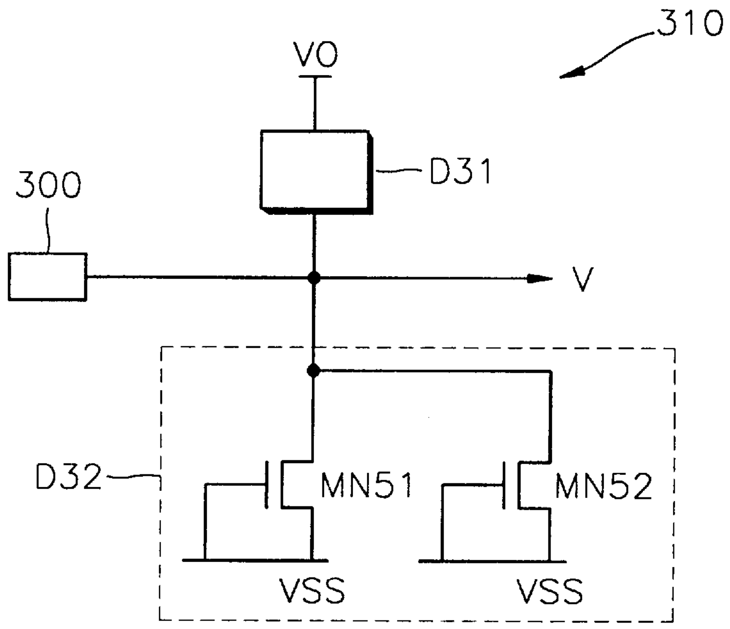
FIG. 5 is a circuit diagram of an electrostatic discharge (ESD) protection unit shown in FIG. 3, according to an illustrative embodiment of the present invention.

FIG. 5 is a circuit diagram of an electrostatic discharge (ESD) protection unit shown in FIG. 3, according to an illustrative embodiment of the present invention. The ESD protection unit 310 can be one of ESD protection units 310*a* through 310*e*. Also, for illustrative purposes, an input pad 300 is shown, with the assumption that the input pad 300 is one of the first through fifth pads 300*a* through 300*e*.

A second protection unit D32 is implemented by thin gate-oxide (hereinafter referred to as thin gox) NMOS transistors MN51 and MN52. That is, the thin gox NMOS transistors MN51 and MN52 are connected in parallel between the input pad 300 and ground potential VSS. That is, drains of the NMOS transistors MN51 and MN52 are connected to the input pad 300, and gates and sources of the NMOS transistors MN51 and MN52 are connected to the ground potential VSS. Here, since the protection device D32 drives a high current at a low operating voltage level, the protection device D32 is preferably implemented by the thin gox transistor. That is, since the thin gox transistor has a low turn-on voltage, and its current driving ability is large, the efficiency of protecting against ESD is high. The operating voltage of the thin gox transistor is decided by the thickness of a gate oxide layer. In a case where a voltage input through the input pad 300 is smaller than a breakdown voltage of the thin gox transistor (for example, V4 and V5), the second protection device D32 is implemented using the thin gox NMOS transistors MN51 and MN52 connected in parallel to each other.

Thus, when the ESD pulse is applied through the input pad 300, the area in which a high current is discharged by the thin gox NMOS transistors MN51 and MN52 is increased, and the efficiency of protecting against ESD is improved. Here, the gates of the NMOS transistors MN51 and MN52 are connected to the ground VSS and turned off during a normal operation.

As described above, the circuit of FIG. 5 can be applied to the case where a voltage applied through the input pad 300 is lower than breakdown voltages of the thin gox transistors MN51 and MN52, and preferably, to part (for example, 310*d* and 310*e*) of the ESD protection units 310*a* through 310*e* of FIG. 3.

Figure 6:
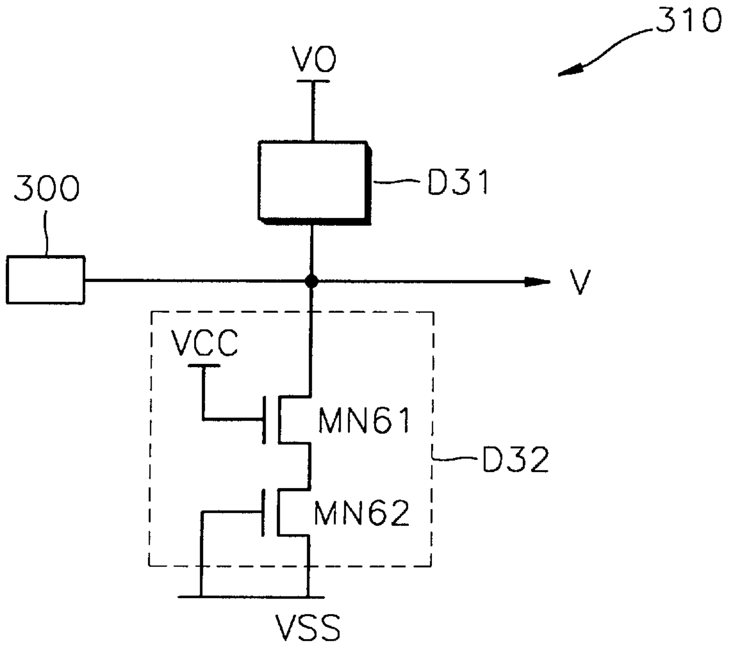
FIG. 6 is a circuit diagram of the ESD protection unit shown in FIG. 3, according to another illustrative embodiment of the present invention.

FIG. 6 is a circuit diagram of the ESD protection unit shown in FIG. 3, according to another illustrative embodiment of the present invention. A second protection unit D32 is implemented by thin gox transistors MN61 and MN62 connected in series between an input pad 300 and ground potential VSS. That is, a drain of the NMOS transistor MN61 is connected to the input pad 300, and a gate of the NMOS transistor MN61 is connected to a power supply voltage VCC. Also, a drain of the NMOS transistor MN62 is connected to a source of the NMOS transistor MN61, and a gate and a source of the NMOS transistor MN62 are connected to the ground potential VSS.

The circuit of FIG. 6 can be applied to the case where a voltage input through the input pad 300 is larger than breakdown voltages of the thin gox transistors MN61 and MN62 in comparison with that of FIG. 5. Thus, preferably, the circuit is applied to part (for example, 310*a* through 310*c*) of the ESD protection units 310*a* through 310*e* of FIG. 3.

In other words, in a case where the voltage applied to the input pad 300 is larger than the withstand voltage of the gate oxide layer of the thin gox transistor, the gate oxide layer should be not physically damaged. Thus, when the ESD pulse is applied through the input pad 300, the NMOS transistor MN61 functions such that a voltage between the gate and the source of the NMOS transistor 62 and a voltage between the gate and the drain of the NMOS transistor MN62 are lower than or equal to a breakdown voltage of the gate oxide layer. Likewise, the efficiency of protecting against ESD can be improved by implementing the ESD protection units 310*a* through 310*c* using two or more thin gox transistors connected in series with each other. Also, the ESD protection units shown in FIGS. 5 and 6 can be applied to the ESD protection unit connected to the output pad.

However, the circuit of FIG. 6 using the thin gox transistor cannot be applied in the case where the voltage input through the input pad 300 is larger than a junction breakdown voltage. Thus, in such a case, it is preferable that the first and second protection devices D31 and D32 are implemented using a silicon controlled rectifier (SCR) having a low trigger voltage, for driving a high current.

The present invention can improve ESD protection without lowering a normal circuit performance in a color LCD driver circuit. Also, the present invention can implement protection devices of ESD protection units connected to an input pad or an output pad, using a thin gate-oxide (gox) transistor, thereby improving the efficiency of protecting against ESD.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A liquid crystal device (LCD) driver circuit comprising:

first through N-th input pads for respectively receiving first through N-th voltages, the first through N-th voltages having different voltage levels and being externally applied to the LCD driver circuit, and the N being an integer greater than one;

first through N-th electrostatic discharge (ESD) protection units respectively connected to the first through N-th input pads, for forming a discharge path when an electrostatic pulse is respectively applied through any of the first through N-th input pads; and an output driver having first through N-th resistors, the first through N-th resistors for respectively receiving the first through N-th voltages input through the first through N-th input pads, and first through N-th voltage transferring units for respectively transferring the first through N-th voltages, respectively, to a first node in response to predetermined first through N-th control signals and the output driver for generating a driving voltage for driving an LCD from each of the first through N-th voltages transmitted through the first through N-th voltage transferring units, respectively;

wherein the first through N-th resistors reduce a current flowing into the output driver when the electrostatic pulse is applied.

2. The LCD driver circuit according to claim 1, wherein the output driver comprises:

a (N+1)-th resistor having a first end and a second end, the first end connected to the first node and the second end connected to a predetermined output pad.

3. The LCD driver circuit according to claim 2, wherein the output driver further comprises an output electrostatic discharge protection unit connected to an end of the predetermined output pad, for forming another discharge path when the electrostatic pulse is externally applied through the predetermined output pad.

4. The LCD driver circuit according to claim 1, wherein the first through N-th voltage transferring units comprise:

first through K-th CMOS transfer gates for respectively transferring first through K-th voltages of the first through N-th voltages to the first node in response to first through K-th control signals of the predetermined first through N-th control signals, respectively, the K being an integer greater than one but less than the N; and (K+1)-th through N-th NMOS transistors for respectively transferring (K+1)-th through N-th voltages of the first through N-th voltages to the first node in response to (K+1)-th through N-th control signals of the predetermined first through N-th control signals, respectively;

wherein the first through K-th voltages have voltage levels higher than the (K+1)-th through N-th voltages.

5. The LCD driver circuit according to claim 1, wherein the first through N-th voltage transferring units respectively comprise first through N-th CMOS transfer gates for respectively transferring the first through N-th voltages to the first node in response to the predetermined first through N-th control signals, respectively.

6. The LCD driver circuit according to claim 1, wherein the output driver comprises:

first through K-th CMOS transfer gates for respectively transferring first through K-th voltages of the first through N-th voltages to the first node in response to first through K-th control signals of the predetermined first through N-th control signals, respectively, the K being an integer greater than one but less than the N; and (K+1)-th through N-th parallel transistors respectively having a parallel structure of an NMOS transistor and a PMOS transistor, for respectively transferring (K+1)-th through N-th voltages of the first through N-th voltages to the first node in response to (K+1)-th through N-th control signals of the predetermined first through N-th control signals, respectively;

wherein a gate of each PMOS transistor of the (K+1)-th through N-th parallel transistors is connected to a high voltage having a voltage level higher than the first through N-th voltages and is turned off during a normal operation.

7. The LCD driver circuit according to claim 1, wherein the first through N-th input pads comprise first through K-th input pads, the first through N-th ESD protection units comprise first through K-th ESD protection units, the K being an integer greater than one but less than the N, each of the first through K-th ESD protection units comprising:

a first protection device respectively connected between a high voltage and a side of the first through K-th input pads, the high voltage having a voltage level higher than the first through N-th voltages; and a second protection device respectively connected in series between each of the first through K-th input pads and a ground potential and respectively having two or more thin-gate-oxide (gox) NMOS transistors, a gate of the two or more gox NMOS transistors being connected to one of the ground potential and a power supply voltage.

8. The LCD driver circuit according to claim 7, wherein the first through N-th input pads comprise (K+1)-th through N-th input pads, the first through N-th ESD protection units comprise (K+1)-th through N-th ESD protection units, each of the (K+1)-th through N-th ESD protection units comprising:

a third protection device respectively connected between the high voltage and a side of the (K+1)-th through N-th input pads; and a fourth protection device respectively connected in parallel between each of the (K+1)-th through N-th input pads and the ground potential and respectively having two or more thin-gate-oxide (gox) NMOS transistors, a gate of the two or more gox NMOS transistors being connected to the ground potential;

wherein each voltage applied through the first through K-th input pads has a level higher than a voltage applied through the (K+1)-th through N-th input pads.

9. The LCD driver circuit according to claim 1, wherein the first through N-th resistors are diffusion-type resistors.

10. A liquid crystal device (LCD) driver circuit comprising:

first through N-th input pads for respectively receiving first through N-th voltages, the first through N-th voltages having different voltage levels and being externally applied to the LCD driver circuit, and the N being an integer greater than one;

first through N-th electrostatic discharge (ESD) protection units respectively connected to the first through N-th input pads, for forming a discharge path when an electrostatic pulse is respectively applied through any of the first through N-th input pads; and an output driver having first through N-th voltage transferring means, the first through N-th voltage transferring means for respectively transferring the first through N-th voltages input through the first through N-th input pads, respectively, and the output driver for generating a driving voltage for driving an LCD from each of the first through N-th voltages transmitted through the first through N-th voltage transferring means, respectively;

wherein at least one voltage transferring means of the first through N-th voltage transferring means transfers low-level voltages of the first through N-th voltages and has a parallel structure of a PMOS transistor and an NMOS transistor.

11. The LCD driver circuit according to claim 10, wherein a gate of the PMOS transistor is connected to a high voltage having a voltage level higher than the first through N-th voltages, and the PMOS transistor is turned off during a normal operation.

12. The LCD driver circuit according to claim 10, wherein the first through N-th voltage transferring means respectively transfer the first through N-th voltages to a first node in response to predetermined first through N-th control signals, respectively.

13. The LCD driver circuit according to claim 12, wherein the first through N-th voltage transferring means respectively comprise first through N-th CMOS transfer gates for respectively transferring the first through N-th voltages to the first node in response to the predetermined first through N-th control signals, respectively.

14. The LCD driver circuit according to claim 12, wherein the output driver further comprises an output electrostatic discharge protection unit connected to a predetermined output pad, for forming another discharge path when the electrostatic pulse is externally applied through the predetermined output pad.

15. A liquid crystal device (LCD) driver circuit comprising:

first through N-th input pads for respectively receiving first through N-th voltages, the first through N-th voltages having different voltage levels and being externally applied to the LCD driver circuit, and the N being an integer greater than one; and first through N-th electrostatic discharge (ESD) protection units respectively connected to the first through N-th input pads and an output driver, the output driver comprising first through N-th resistors and first through N-th voltage transferring units, wherein the ESD protection units form a discharge path when an electrostatic pulse is respectively applied through any of the first through N-th input pads;

wherein the first through N-th ESD protection units comprise at least one thin gate-oxide (gox) transistor.

16. The LCD driver circuit according to claim 15, wherein the first through N-th input pads comprise first through K-th input pads, the first through N-th ESD protection units comprise first through K-th ESD protection units, the K being an integer greater than one but less than the N, each of the first through K-th ESD protection units comprising:

a first protection device respectively connected between a high voltage and one side of the first through K-th input pads, the high voltage having a voltage level higher than the first through N-th voltages; and a second protection device respectively connected in series between each of the first through K-th input pads and a ground potential and respectively having two or more thin-gate-oxide (gox) NMOS transistors, a gate of the two or more gox NMOS transistors being connected to one of the ground potential and a power supply voltage.

17. The LCD driver circuit according to claim 16, wherein the first through N-th input pads comprise (K+1)-th through N-th input pads, the first through N-th ESD protection units comprise (K+1)-th through N-th ESD protection units, each of the (K+1)-th through N-th ESD protection units comprising:

a third protection device respectively connected between the high voltage and a side of the (K+1)-th through N-th input pads; and a fourth protection device respectively connected in parallel between each of the (K+1)-th through N-th input pads and the ground potential and respectively having two or more thin-gate-oxide (gox) NMOS transistors, a gate of the two or more gox NMOS transistors being connected to the ground potential;

wherein each voltage applied through the first through K-th input pads has a voltage level higher than a voltage applied through the (K+1)-th through N-th input pads.

18. The LCD driver circuit according to claim 15, wherein the first through N-th resistors, are configured to respectively receive the first through N-th voltages input through the first through N-th input pads, and the output driver is configured to generate a driving voltage for driving an LCD from each of the first through N-th voltages received through the first through N-th resistors, respectively, wherein the first through N-th resistors reduce a current flowing into the output driver when the electrostatic pulse is applied.

19. The LCD driver circuit according to claim 18, wherein the first through N-th voltage transferring units are configured to respectively input the first through N-th voltages through the first through N-th resistors, respectively, and to respectively transfer the first through N-th voltages to a first node in response to predetermined first through N-th control signals.

20. The LCD driver according to claim 18, wherein the output driver further comprises:

a (N+1)-th resistor having a first end and a second end, the first end connected to the first node and the second end connected to a predetermined output pad.

* * * * *